United States Patent
Stoilov et al.

(10) Patent No.: US 9,311,068 B2
(45) Date of Patent: Apr. 12, 2016

(54) DEPLOYMENT OF WEB APPLICATION ARCHIVES AS A PREPROCESSING STEP FOR PROVISIONING

(75) Inventors: Dimo Stoilov, Sofia (BG); Georgi Stanev, Sofia (BG); Shenol Yousouf, Sofia (BG)

(73) Assignee: SAP SE, Walldorf (DE)

( * ) Notice: Subject to any disclaimer, the term of this patent is extended or adjusted under 35 U.S.C. 154(b) by 868 days.

(21) Appl. No.: 13/448,408

(22) Filed: Apr. 17, 2012

(65) Prior Publication Data
US 2013/0275623 A1 Oct. 17, 2013

(51) Int. Cl.
G06F 9/445 (2006.01)
G06F 9/50 (2006.01)

(52) U.S. Cl.
CPC ............... G06F 8/61 (2013.01); G06F 9/5072 (2013.01)

(58) Field of Classification Search
CPC ............... G06F 8/60; G06F 8/61; G06F 8/65; G06F 9/5072
USPC .................................................. 717/174–178
See application file for complete search history.

(56) References Cited

U.S. PATENT DOCUMENTS

| 8,448,163 | B2 * | 5/2013 | Backhouse | 717/174 |
| 2008/0046882 | A1 * | 2/2008 | Blackhouse | 717/174 |
| 2009/0276770 | A1 * | 11/2009 | Taieb et al. | 717/177 |
| 2012/0246313 | A1 * | 9/2012 | Ho et al. | 709/225 |
| 2012/0246316 | A1 * | 9/2012 | Ramu et al. | 709/226 |

OTHER PUBLICATIONS

Introduction to the dm Server, Pro Spring Source dm Server, 2009, pp. 85-104.*
Integrating Spring and OSGi, Pro Spring Dynamic Modules for OSGi Service Platforms, 2009, pp. 109-147.*
Keith Donald, Erwin Vervaet, Jeremy Grelle, Scott Andrews, Rossen Stoyanchev; How to access Web Flow artifacts from the SpringSource Bundle Repository; Spring Web Flow Reference Guide—Spring Web Flow, Version 2.0.9; Web Accessed on May 8, 2012; SpringSource.org, Palo Alto, CA, USA; (http://static.springsource.org/spring-webflow/docs/2.0.x/reference/html/ch01s06.html).

* cited by examiner

*Primary Examiner* — Anna Deng

(57) ABSTRACT

In one aspect, a transformation of web application archives (WARs) to Open Services Gateway initiative (OSGi™) web bundles is performed. WARs are specialized Java® archives for packaging web applications and the transformation to OSGi™ web bundles is realized by applying proper entries to the manifest of the WARs thus making them OSGi™ compliant. In another aspect, the transformed WARs to OSGi™ web bundles are marked as auto started so that the web application is available for requests after product installation.

11 Claims, 4 Drawing Sheets

DEPLOYMENT OF WEB APPLICATION ARCHIVES AS A PREPROCESSING STEP FOR PROVISIONING

FIELD

The field relates to web applications development and their deployment in a cloud environment. More precisely, the field relates to deployment of web application archives as a preprocessing step for provisioning.

BACKGROUND

Cloud computing (cloud, cloud environment) is typically delivery of computing as a service rather than a product, wherein shared resources, software and information are provided as a utility over a network. Cloud computing provides computation, software applications, data access, data management and storage resources without requiring cloud users to know the location and other details of the computing infrastructure. End users typically access cloud based applications through a web browser or a light weight desktop or mobile applications while the business software and data are typically stored on servers at a remote location. Cloud application providers strive to give the same or better service and performance than if the software programs were installed locally on end-user computers. Software developers use Integrated Development Environment (IDE) when building software applications to be deployed in the cloud.

One of the goals of cloud computing is to minimize Total Cost of Ownership (TCO) and resource consumption. There may be several factors that affect the consumption and TCO in a cloud infrastructure. For example, proper selection of runtime components, which are needed by a customer application to be operable in the cloud is one of the factors that may affect resource consumption and TCO in a cloud environment. The set of components for provisioning a developed product (besides the software application itself) usually includes core parts of runtime environment (e. g. Java® server for the Java® based applications); enterprise services, which provide additional functionality to the deployed applications; and internal configuration information. Another factor is complexity of the provisioning process: the more complex the provisioning process is, and the more steps it involves, the more likely the process might fail at a certain point. Thus, the predictability of failures in the provisioning process is another factor. For example, when there are many steps involved in the preparation of the application for deployment in the cloud, a possible failure in the final stages will incur a greater cost on the resources wasted up to that point.

Equinox® p2 is a component of the Equinox® project, Equinox® p2 provides a provisioning platform for Eclipse® based applications. Based on the Eclipse® Equinox® Provisioning Platform (p2), cloud deployment process comprises publishing of an Eclipse® product definition, containing and configuring software application artifacts that need to be installed during the software application start. As a result of the deployment, the cloud distribution, cloud services (used from the software application) and installable units of the deployed software application are merged in the Eclipse® product (p2 product) and published in a p2 update site, stored in a cloud repository. During the start of the corresponding software application component, the published p2 product is installed via p2 from the repository to the file system of a running virtual machine image.

SUMMARY

Various embodiments of systems and methods for web application archive (WAR) deployment as a preprocessing step for cloud computing services provisioning are described herein. In one embodiment, the method includes receiving one or more WAR files and transforming the one or more WAR files to web bundles configured according to Open Services Gateway initiative (OSGi™) standard specification. The method also includes generating an Equinox® Provisioning Platform (p2) product based on the WAR files transformed to the OSGi™ specification web bundles and one or more other OSGi™ web bundles persisted in a p2 update site and provisioning the p2 product on a virtual machine image.

In other embodiments, the system includes a processor for executing program code and memory in communication with the processor. The system also includes a receiving module to receive one or more WAR files and a transforming module to transform the one or more WAR files to OSGi™ web bundles. The system further includes a generator module to generate a p2 product based on the WAR files transformed to the OSGi™ web bundles and one or more other OSGi™ web bundles persisted in a p2 update site and a provisioning module to provision the p2 product on a virtual machine image.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for web application archive (WAR) deployment as a preprocessing step for provisioning are described herein. In the following description, numerous specific details are set forth to provide a thorough understanding of embodiments of the invention. One skilled in the relevant art will recognize, however, that the invention cart be practiced without one or more of the specific details, or with other methods, components, materials, etc. In other instances, well known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
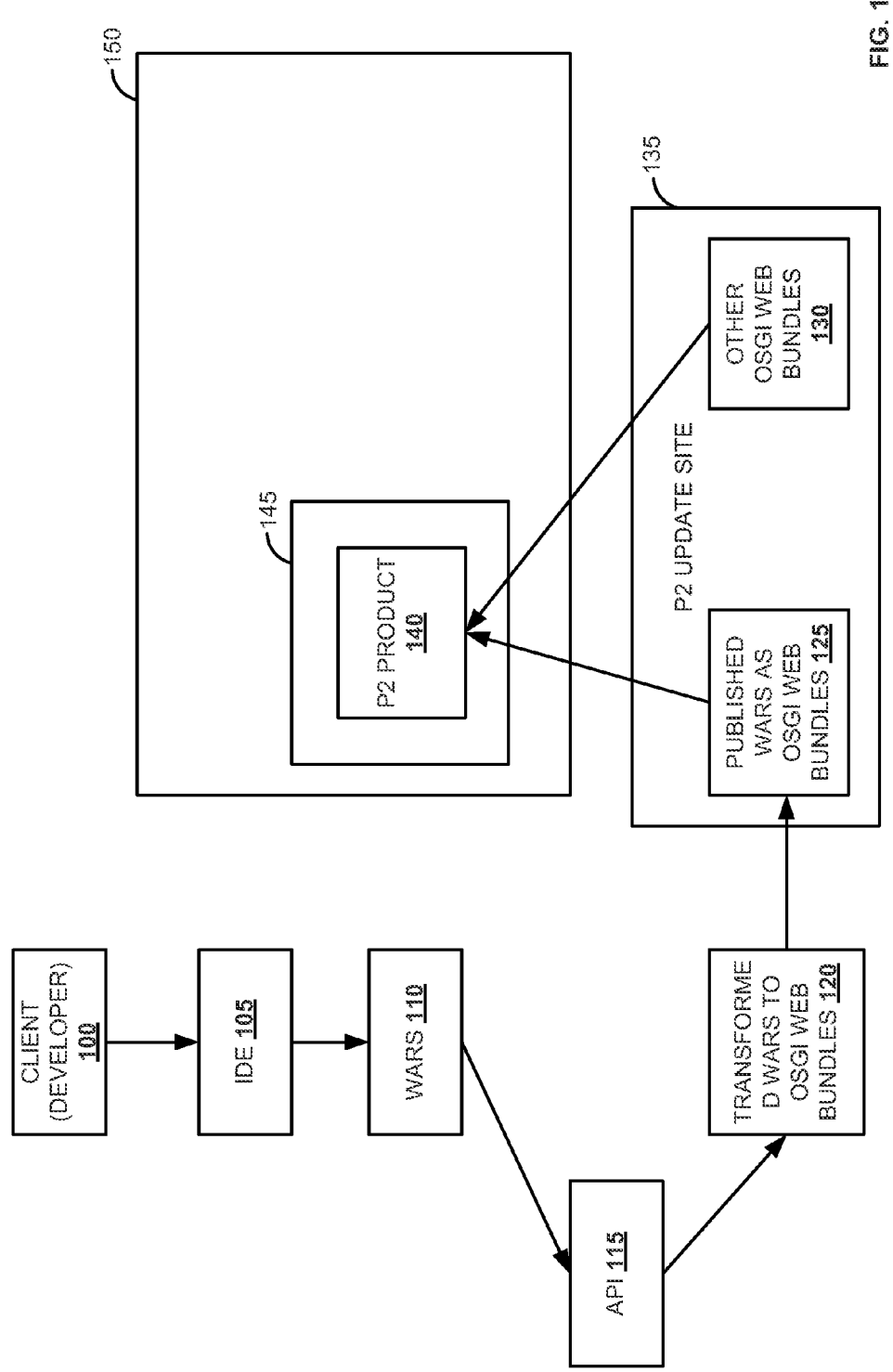
FIG. 1 is a block diagram of an embodiment of a system illustrating a process for generating and publishing web application archives (WAR) as a preprocessing step for provisioning services on a cloud.

FIG. 1 is a block diagram of an embodiment of a system illustrating a process for generating and publishing web application archives (WAR) as a preprocessing step for provisioning. When deploying raw artifacts (e.g., web application archives) directly to cloud environment, there are no intermediate steps between a client 100 and a deploy service of a cloud 150. WARs are specialized Java® archives for packaging web applications. In order to adapt web applications to execute on p2 platform, this case requires a few additional preprocessing steps to be executed in order to publish these raw artifacts to a p2 update site 135 and deploy them. Typically, a client 100 that intends to develop a web application to be deployed in the cloud 150, based on OSGi™ via the Eclipse® Equinox® Provisioning Platform (p2), uses an Integrated Development Environment (IDE) 105 to build the web application. The generated web application is then packed in WARs 110, which are specialized Java® archives for packaging web applications. The WARs 110 are the output of the development of the web application and they are considered raw artifacts, because they cannot be used directly by the deploy service of the cloud 150. An external API 115 serves as an external service for transformation of the WARs 110 to OSGi™ web bundles 120. The OSGi™ specification defines the OSGi™ bundle as the unit of modularization. A bundle is a cohesive, self-contained unit, which explicitly defines its dependencies to other modules and services. It also explicitly defines its external application programming interface (API). Technically OSGi™ bundles are ".jar" files with additional metadata information. This metadata information is stored in the "META-INF" folder in the "MANIFEST.MF" The "MANIFEST.MF" file, also referred to as "manifest" is part of a standard jar specification to which OSGi™ adds additional metadata. Any non-OSGi™ runtime will ignore the OSGi™ metadata. Therefore OSGi™ bundles can be used without restrictions in non-OSGi™ Java® environments. However, WARs are not OSGi™ ready and when deploying WARs to a p2 platform, a transformation of the WARs to OSGi™ bundles is necessary. The transformed WARs 110 to OSGi™ bundles 120 are then published to a p2 update site 135. A p2 product 140 is then generated based on the published WARs as OSGi™ bundles 125 and other OSGi™ bundles 130 present in the p2 update site 135. The p2 product 140 is provisioned on a virtual machine 145 in the cloud 150.

Figure 2:
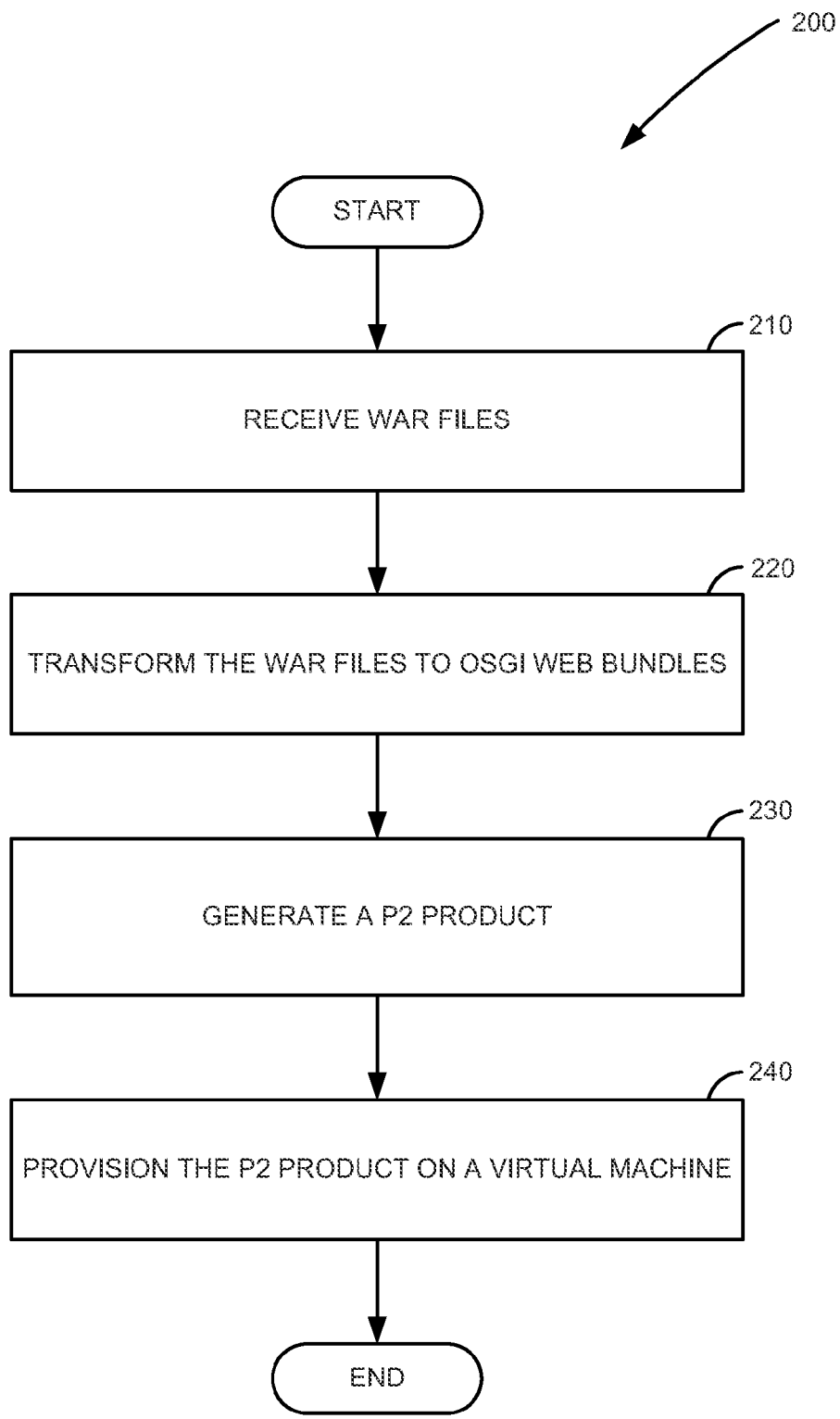
FIG. 2 is a flow diagram of an embodiment of a method to deploy web application archives (WARs) as a preprocessing step for provisioning.

FIG. 2 is a flow diagram of an embodiment of a method 200 to deploy web application archives (WARs) as a preprocessing step for provisioning. The method begins at block 210 with receiving one or more WAR files. Web application archives are specialized Java® archives for packaging web applications. A developer builds a web application and the output is WAR files. In one embodiment, the developer may be client 100. The developer uses external IDE not relevant to a cloud environment based on OSGi™ and cloud deployment based on the Eclipse® Equinox® Provisioning Platform (p2), where the developer intends to deploy the web application, and the WAR files do not include the peculiarities specific to the cloud environment. In one embodiment, the developer may use IDE such as IDE 105 and the output of the development may be WARs such as WARs 110.

At block 220, the one or more WAR files are transformed to Open Services Gateway initiative (OSGi™) web bundles. In one embodiment, the WAR files are transformed by an external API, such as API 115. This transformation aims deployment of the web application contained in the WAR files to an Equinox® Provisioning Platform (p2, p2 framework), which is a framework where the already transformed WARs may be deployed. In one embodiment, the transformation of the one or more WAR files to OSGi™ web bundles includes transforming WAR manifest of the one or more WAR files to OSGi™ manifest and publishing the transformed WARs OSGi™ web bundles to a p2 update site. The p2 update site may be such as p2 update site 135. Transforming a WAR manifest to an OSGi™ manifest makes the WAR files OSGi™ compliant and they are considered OSGi™ web bundles by the p2 framework. In one embodiment, the p2 framework may be such as cloud environment 150. Publishing the transformed WARs to OSGi™ web bundles to a p2 update site prepares the web application contained initially in the WARs for deployment in a p2 framework.

Further, at block 230, a p2 product is generated. The p2 product is generated based on the transformed WAR files to the OSGi™ web bundles and one or more other OSGi™ web bundles persisted in a p2 update site. In one embodiment, the generation of the p2 product includes generation of p2 product metadata. In one embodiment, the p2 product metadata includes information describing hardware and software resources to be employed to execute the web application contained in the WARs. In one embodiment, the p2 product metadata may further include any runtime rules or policies to be implemented during execution of the application. In one embodiment, the OSGi™ web bundles based on the transformed WARs are marked as auto started in the generated p2 product metadata.

Then, at block 240, the generated p2 product is provisioned on a virtual machine image. In one embodiment, the p2 product may be such as p2 product 140 and the virtual machine image may be such as virtual machine image 145.

In one embodiment, the generated p2 product is tested in a p2 framework before provisioning. In one embodiment, the testing of the p2 product includes testing integration of components of the p2 product in a p2 framework. In one embodiment, the tested components include transformed WAR files and OSGi™ web bundle Java® archive files.

Figure 3:
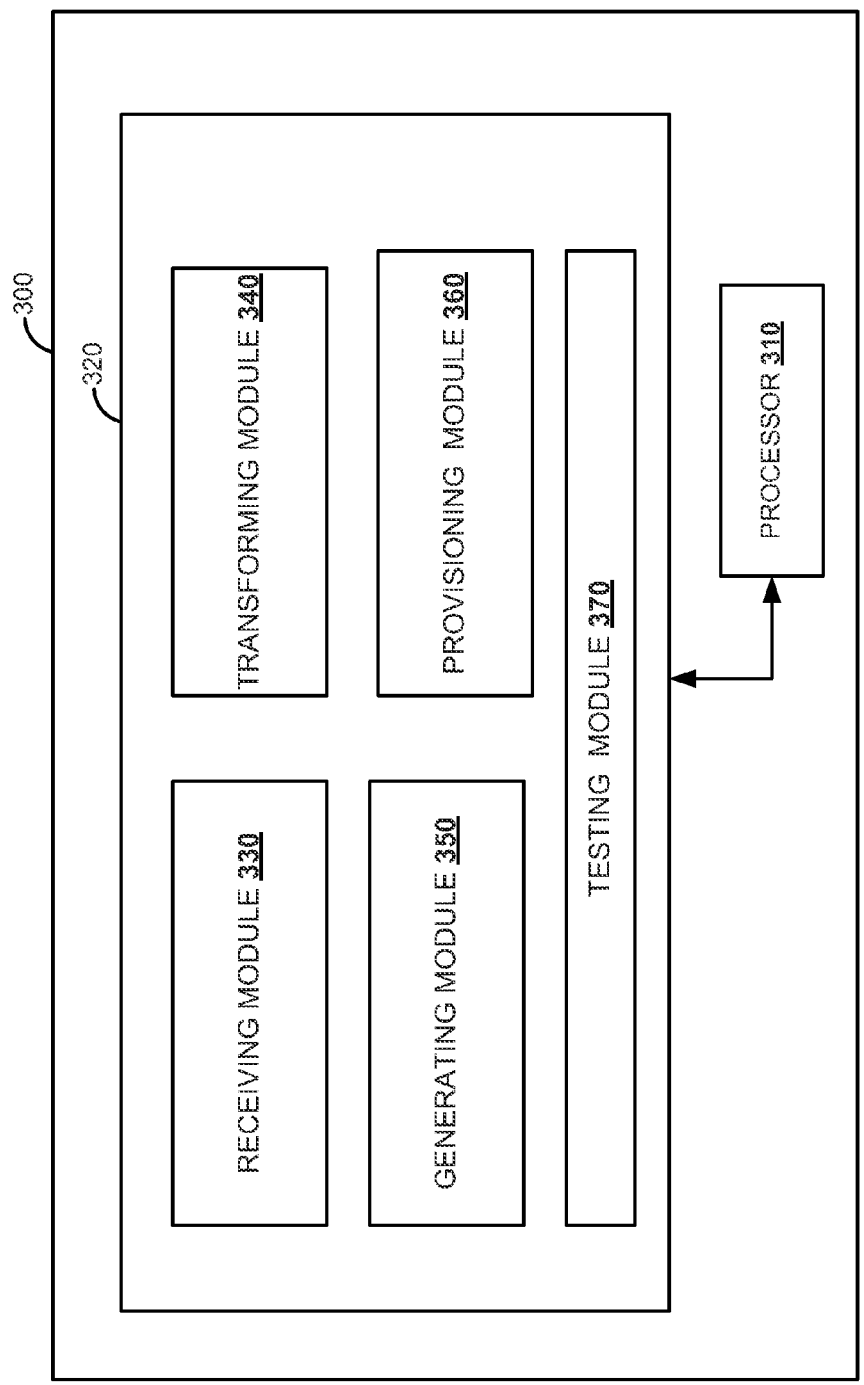
FIG. 3 is a block diagram of an embodiment of a system to deploy web application archives (WARs) as a preprocessing step for provisioning.

FIG. 3 is a block diagram of an embodiment of a system 300 to deploy web application archives (WARs) as a preprocessing step for provisioning. The system 300 includes a processor 310 for executing program code and computer memory 320 in communication with the processor 310. The system 300 further includes a receiving module 330 to receive one or more WAR files. The one or more WAR files are output of an IDE used by an application developer building a web application. The web application is intended to be deployed in a cloud environment, based on OSGi™ via the Eclipse® Equinox® Provisioning Platform (p2). The developer uses external IDE not relevant to a cloud environment, where the developer intends to deploy the web application, and the WAR files do not include the peculiarities specific to the cloud environment.

A transforming module 340 is operable to transform the one or more WAR files to Open Services Gateway initiative (OSGi™) web bundles. This transformation aims to deploy the web applications contained in the WAR files to an Equinox® Provisioning Platform (p2, p2 framework), which is a framework where the already transformed WARs may be deployed. In one embodiment, the transforming module 340 is further operable to transform WAR manifest of the one or more WAR files to OSGi™ manifest and publish the OSGi™ web bundles to a p2 update site. Publishing the processed WARs to OSGi™ web bundles to a p2 update site prepares the web application contained initially in the WARs for deployment in a p2 framework.

A generating module 350 is operable to generate the p2 product based on the transformed WAR files to OSGi™ web bundles and one or more other OSGi™ web bundles persisted in a p2 update site. In one embodiment, the generating module 350 is operable to generate a p2 product metadata. In one embodiment, the p2 product metadata includes information describing hardware and software resources to be employed to execute the web application contained in the WARs. In one embodiment, the p2 product metadata may further include any runtime rules or policies to be implemented during execution of the application. In one embodiment, the transformed WARs to OSGi™ web bundles are marked as auto started in the generated p2 product metadata. Thus, the web application contained initially in the WARs is available for requests after product installation.

A provisioning module 360 is operable to provision the p2 product on a virtual machine image. The virtual machine image is deployed in a p2 cloud environment.

In one embodiment, the system 300 farther includes a testing module 370 to test the p2 product in a p2 framework. In one embodiment, the testing module 370 is operable to test integration of components of the p2 product in the p2 framework.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java®, C++, or other object-oriented programming language and development tools. Another embodiment of the invention may be implemented in hard-wired circuitry in place of, or in combination with machine readable software instructions.

Figure 4:
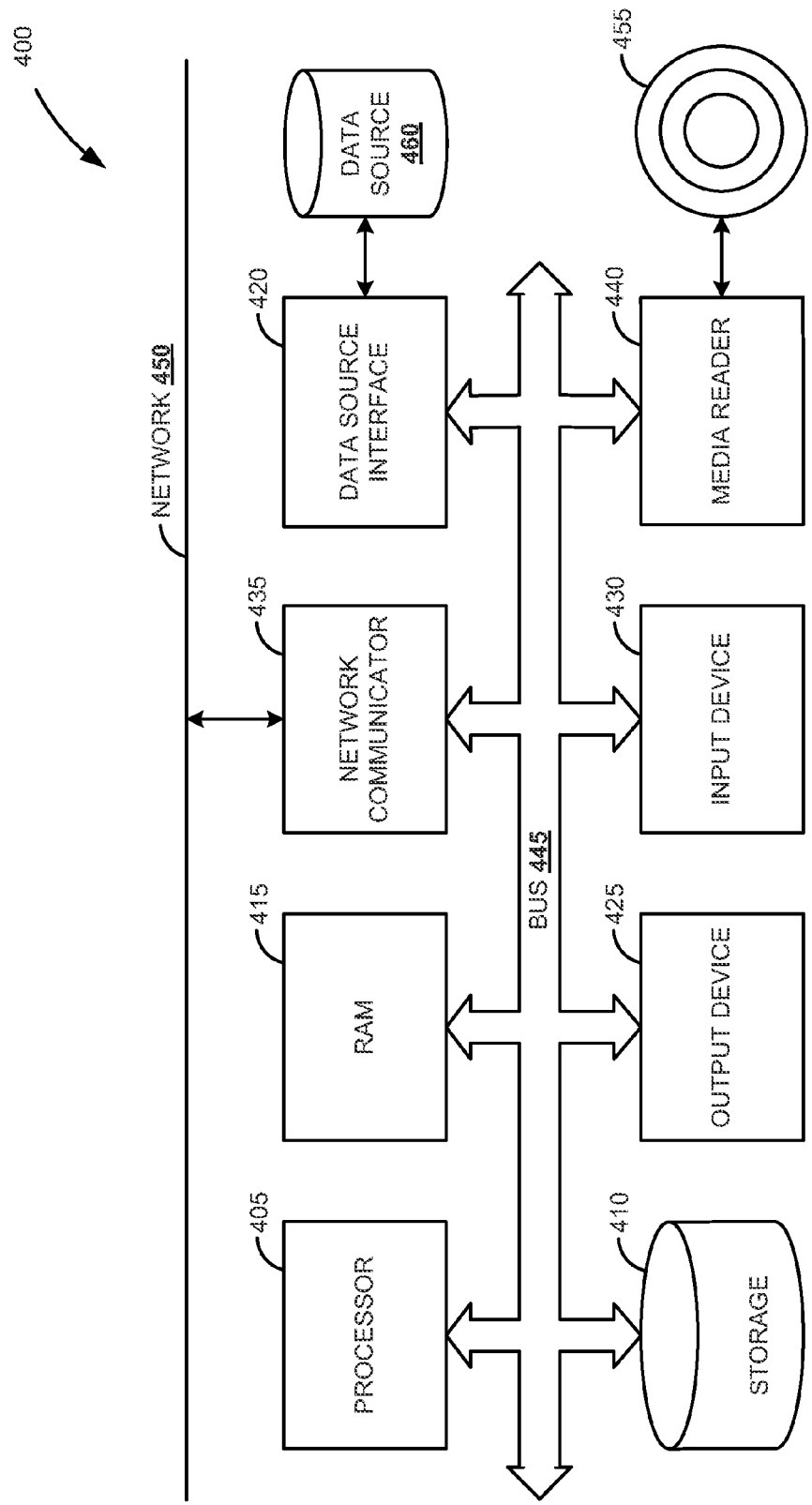
FIG. 4 is a block diagram illustrating a computing environment in which the techniques described for web application archive (WAR) deployment as a preprocessing step for provisioning can be implemented, according to an embodiment.

FIG. 4 is a block diagram of an exemplary computer system 400. The computer system 400 includes a processor 405 that executes software instructions or code stored on a computer readable storage medium 455 to perform the above-illustrated methods of the invention. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. The stored instructions may be further compiled to generate other representations of the instructions and dynamically stored in the RAM 415, The processor 405 reads instructions from the RAM 415 and performs actions as instructed. According to one embodiment of the invention, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A method for provisioning a Provisioning Platform product based on web application archive files comprising:
    receiving one or more web application archive files for cloud deployment of a web application via a Provisioning Platform;
    transforming the one or more web application archive files to Open Services Gateway initiative web bundles;
    transforming a web application archive manifest of the one or more web application archive files to an Open Services Gateway initiative manifest;
    publishing the Open Services Gateway initiative web bundles to a Provisioning Platform update site based on the Open Services Gateway initiative manifest;
    generating the Provisioning Platform product for provisioning the web application in a cloud environment, wherein the Provisioning Platform product includes and configures the transformed Open Services Gateway initiative web bundles and one or more other Open Services Gateway initiative web bundles persisted in the Provisioning Platform update site;
    generating a Provisioning Platform product metadata for the Provisioning Platform product, describing hardware and software resources together with runtime rules and policies to be employed when executing the web application in the cloud environment as defined in the Provisioning Platform product, wherein the Open Services Gateway initiative web bundles are marked as auto started in the generated Provisioning Platform product metadata; and
    provisioning the Provisioning Platform product on a virtual machine image in the cloud environment.

2. The method of claim 1, further comprising testing the Provisioning Platform product in a Provisioning Platform framework.

3. The method of claim 2, wherein testing the Provisioning Platform product further comprises testing integration of components of the Provisioning Platform product in the Provisioning Platform framework.

4. The method of claim 3, wherein the components of the Provisioning Platform product comprise transformed web application archive files and Open Services Gateway initiative web bundle Java® archive (JAR) files.

5. A computer system for provisioning an Provisioning Platform product based on web application archive files comprising:
    a processor; and
    a memory in communication with the processor, the memory storing instructions related to:
    a receiving module to receive one or more web application archive files for cloud deployment of a web application via a Provisioning Platform;
    a transforming module to:
        transform the one or more web application archive files to Open Services Gateway initiative web bundles;
        transform a web application archive manifest of the one or more web application archive files to an Open Services Gateway initiative manifest;
        publish the Open Services Gateway initiative web bundles to a Provisioning Platform update site based on the Open Services Gateway initiative manifest;
    a generating module to:
        generate the Provisioning Platform product for provisioning the web application in a cloud environment, wherein the Provisioning Platform product includes and configures the transformed Open Service Gateway initiative web bundles and one or more other Open Services Gateway initiative web bundles persisted in the Provisioning Platform update site; and
        generate a Provisioning Platform product metadata for the Provisioning Platform product, describing hardware and software resources together with runtime rules and policies to be employed when executing the web application in the cloud environment as defined in the Provisioning Platform product, wherein the Open Services Gateway initiative web bundles are marked as auto started in the generated Provisioning Platform product metadata; and
    a provisioning module to provision the Provisioning Platform product on a virtual machine image in the cloud environment.

6. The system of claim 5, further comprising a testing module to test the Provisioning Platform product in a Provisioning Platform framework.

7. The system of claim 6, wherein the testing module is operable to test integration of components of the Provisioning Platform product in the Provisioning Platform framework.

8. An article of manufacture including a non-transitory computer readable storage medium to tangibly store instructions, which when executed by a computer, cause the computer to:
    receive one or more web application archive files for cloud deployment of a web application via a Provisioning Platform;
    transform the one or more web application archive files to Open Services Gateway initiative web bundles;
    transform a web application archive manifest of the one or more web application archive files to an Open Services Gateway initiative manifest;
    publish the Open Services Gateway initiative web bundles to a Provisioning Platform update site based on Open Services Gateway initiative manifest;
    generate a Provisioning Platform product for provisioning the web application in a cloud environment, wherein the Provisioning Platform product includes and configures the transformed Open Services Gateway initiative web bundles and one or more other Open Services Gateway initiative web bundles persisted in the Provisioning Platform update site;

generate a Provisioning Platform product metadata for the Provisioning Platform product, describing hardware and software resources together with runtime rules and policies to be employed when executing the web application in the cloud environment as defined in the Provisioning Platform product, wherein the Open Services Gateway initiative web bundles are marked as auto started in the generated Provisioning Platform product metadata; and provision the Provisioning Platform product on a virtual machine image in the cloud environment.

9. The article of manufacture of claim 8, further comprising instructions, which when executed by a computer, cause the computer to test the Provisioning Platform product in a Provisioning Platform framework.

10. The article of manufacture of claim 9, the instructions to test the Provisioning Platform product in a Provisioning Platform framework further comprise instructions, which when executed by a computer, cause the computer to test integration of components of the Provisioning Platform product in the Provisioning Platform framework.

11. The article of manufacture of claim 10, wherein the components of the Provisioning Platform product comprise transformed WAR files and Open Services Gateway initiative web bundle Java® archive (JAR) files.

* * * * *